US010482878B2

(12) United States Patent
Wolff et al.

(10) Patent No.: US 10,482,878 B2
(45) Date of Patent: *Nov. 19, 2019

(54) SYSTEM AND METHOD FOR SPEECH ENHANCEMENT IN MULTISOURCE ENVIRONMENTS

(71) Applicant: Nuance Communications, Inc., Burlington, MA (US)

(72) Inventors: Tobias Wolff, Neu-Ulm Burlafingen (DE); Jan Philip Janssen, Ulm (DE); Simon Graf, Ulm (DE); Tim Haulick, Blaubeuren (DE)

(73) Assignee: Nuance Communications, Inc., Burlington, MA (US)

( * ) Notice: Subject to any disclaimer, the term of this patent is extended or adjusted under 35 U.S.C. 154(b) by 16 days.

This patent is subject to a terminal disclaimer.

(21) Appl. No.: 15/831,808

(22) Filed: Dec. 5, 2017

(65) Prior Publication Data
US 2019/0164542 A1 May 30, 2019

Related U.S. Application Data

(63) Continuation-in-part of application No. 15/825,775, filed on Nov. 29, 2017, now Pat. No. 10,157,611.

(51) Int. Cl.
G10L 15/22 (2006.01)
G10L 15/20 (2006.01)
G10L 15/183 (2013.01)

(52) U.S. Cl.
CPC ............ G10L 15/20 (2013.01); G10L 15/183 (2013.01); G10L 15/22 (2013.01)

(58) Field of Classification Search
CPC combination set(s) only.
See application file for complete search history.

(56) References Cited

U.S. PATENT DOCUMENTS 7,203,652 B1 * 4/2007 Heck ................. G10L 15/32
704/231
7,228,275 B1 6/2007 Endo et al.
8,060,366 B1 * 11/2011 Maganti ............ H04L 65/403
370/260
9,293,151 B2 3/2016 Herbig et al.
9,318,107 B1 * 4/2016 Sharifi ................ G10L 15/08
(Continued)

OTHER PUBLICATIONS

Non-Final Office Action issued in U.S. Appl. No. 15/825,775 dated May 11, 2018.
(Continued)

Primary Examiner — Shreyans A Patel
(74) Attorney, Agent, or Firm — Brian J. Colandreo; Michael T. Abramson; Holland & Knight LLP

(57) ABSTRACT

A method, computer program product, and computer system for receiving, by a computing device, a first signal emitted from one or more sources. A second signal may be received emitted from the one or more sources. A first confidence level that the wake-up-word is included in the first signal may be determined. A second confidence level that the wake-up-word is included in the second signal may be determined. It may be identified that the wake-up-word originated from a first source of the one or more sources based upon, at least in part, the first and second confidence levels. The first source may be enabled to participate in a dialog phase.

20 Claims, 4 Drawing Sheets

(56) References Cited

U.S. PATENT DOCUMENTS

| | | | |
|---|---|---|---|
| 9,679,569 B2* | 6/2017 | Foerster | G10L 17/22 |
| 9,727,561 B1* | 8/2017 | Ko | G06F 16/93 |
| 9,728,188 B1* | 8/2017 | Rosen | G10L 15/22 |
| 9,734,830 B2* | 8/2017 | Lindahl | G10L 15/32 |
| 9,787,838 B1* | 10/2017 | Lembersky | H04M 3/5175 |
| 9,792,914 B2* | 10/2017 | Alvarez Guevara | G10L 15/08 |
| 10,079,015 B1* | 9/2018 | Lockhart | G10L 15/22 |
| 2004/0236573 A1 | 11/2004 | Sapeluk | |
| 2005/0195988 A1 | 9/2005 | Tashev et al. | |
| 2010/0179812 A1* | 7/2010 | Jang | G10L 15/065 704/244 |
| 2011/0276326 A1* | 11/2011 | Fumarolo | H04M 3/42187 704/235 |
| 2011/0282661 A1 | 11/2011 | Dobry et al. | |
| 2012/0062729 A1* | 3/2012 | Hart | G06F 1/1626 348/135 |
| 2014/0100848 A1 | 4/2014 | Shaffer et al. | |
| 2014/0163978 A1 | 6/2014 | Basye et al. | |
| 2015/0046157 A1 | 2/2015 | Wolff et al. | |
| 2015/0071461 A1 | 3/2015 | Thyssen et al. | |
| 2015/0095026 A1 | 4/2015 | Bisani et al. | |
| 2015/0235281 A1* | 8/2015 | Jain | G06Q 30/0282 705/347 |
| 2015/0245154 A1* | 8/2015 | Dadu | G06F 3/167 381/56 |
| 2015/0301796 A1 | 10/2015 | Visser et al. | |
| 2016/0077794 A1* | 3/2016 | Kim | G10L 15/22 704/275 |
| 2016/0085565 A1* | 3/2016 | Arcese | G06F 9/4451 726/7 |
| 2016/0125879 A1* | 5/2016 | Lovitt | G10L 17/10 704/275 |
| 2016/0234204 A1* | 8/2016 | Rishi | G06F 21/31 |
| 2016/0266910 A1 | 9/2016 | Bansal et al. | |
| 2016/0314785 A1* | 10/2016 | Matsuoka | G10L 15/22 |
| 2016/0323668 A1* | 11/2016 | Abraham | H04R 31/00 |
| 2017/0083285 A1* | 3/2017 | Meyers | G10L 15/063 |
| 2017/0242657 A1* | 8/2017 | Jarvis | G06F 3/167 |
| 2017/0243586 A1* | 8/2017 | Civelli | G10L 15/32 |
| 2017/0330563 A1* | 11/2017 | Daley | G10L 15/08 |
| 2018/0061422 A1* | 3/2018 | Wang | G10L 17/22 |
| 2018/0082689 A1* | 3/2018 | Khoury | G06N 7/005 |
| 2019/0027138 A1* | 1/2019 | Wang | G10L 15/22 |

OTHER PUBLICATIONS

Notice of Allowance issued in U.S. Appl. No. 15/825,775 dated Aug. 10, 2018.

International Search Report issued in PCT Application No. PCT/US2018/063119 dated Feb. 6, 2019.

* cited by examiner

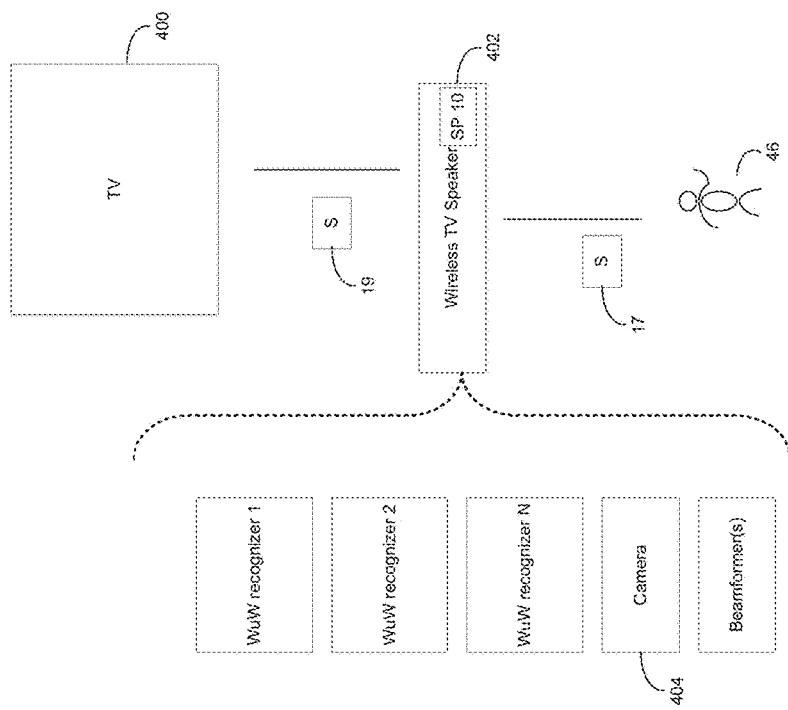

SYSTEM AND METHOD FOR SPEECH ENHANCEMENT IN MULTISOURCE ENVIRONMENTS

RELATED APPLICATION(S)

This application is a continuation-in-part of U.S. application Ser. No. 15/825,775, filed on 29 Nov. 2017, entitled "System and Method for Speech Enhancement in Multisource Environments", the contents of which are incorporated herein by reference.

BACKGROUND

Generally, multisource classifiers (identifiers) may be used, e.g., for Speech Signal Enhancement (SSE) purposes, to help determine which input sources should be used in Automatic Speech Recognition (ASR), and which should be excluded. For instance, the principle may be to have some core localizer that delivers the raw localization data (for instance "steered response power"). The raw data may then be classified into different classes corresponding to the sources. Existing methods for this may represent the raw input data in every frame (e.g., 10-20 ms) as a Gaussian Mixture model (GMM). This GMM may be initialized to have many classes (sources) and then the number of classes is shrunk iteratively. The commonly used algorithm for fitting a GMM is the "Expectation Maximization" algorithm (EM). Due to the shrinking, many iterative steps are generally required, which makes it computationally more demanding, and the fitting algorithm may restart in every frame.

BRIEF SUMMARY OF DISCLOSURE

In one example implementation, a method, performed by one or more computing devices, may include but is not limited to receiving, by a computing device, a first signal emitted from one or more sources. A second signal may be received emitted from the one or more sources. A first confidence level that the wake-up-word is included in the first signal may be determined. A second confidence level that the wake-up-word is included in the second signal may be determined. It may be identified that the wake-up-word originated from a first source of the one or more sources based upon, at least in part, the first and second confidence levels. The first source may be enabled to participate in a dialogue phase.

One or more of the following example features may be included. At least a second source of the one or more sources may be excluded from participating in the dialogue phase. A wrapped Gaussian mixture model may be used, at least in part, to identify the one or more sources. A Bayes decision process may be used, at least in part, to identify the one or more sources. Movement of the first source may be tracked with at least one of one or more core localizers. The first signal and the second signal may be received at a microphone group. One or more angles at a given frequency expected to exhibit a maximum grating lobe may be determined based upon, at least in part, a latest model state. A beamformer may extract any source of the one or more sources except sources of the one or more sources deemed as interference.

In another example implementation, a computing system may include one or more processors and one or more memories configured to perform operations that may include but are not limited to receiving a first signal emitted from one or more sources. A second signal may be received emitted from the one or more sources. A first confidence level that the wake-up-word is included in the first signal may be determined. A second confidence level that the wake-up-word is included in the second signal may be determined. It may be identified that the wake-up-word originated from a first source of the one or more sources based upon, at least in part, the first and second confidence levels. The first source may be enabled to participate in a dialogue phase.

One or more of the following example features may be included. At least a second source of the one or more sources may be excluded from participating in the dialogue phase. A wrapped Gaussian mixture model may be used, at least in part, to identify the one or more sources. A Bayes decision process may be used, at least in part, to identify the one or more sources. Movement of the first source may be tracked with at least one of one or more core localizers. The first signal and the second signal may be received at a microphone group. One or more angles at a given frequency expected to exhibit a maximum grating lobe may be determined based upon, at least in part, a latest model state. A beamformer may extract any source of the one or more sources except sources of the one or more sources deemed as interference.

In another example implementation, a computer program product may reside on a computer readable storage medium having a plurality of instructions stored thereon which, when executed across one or more processors, may cause at least a portion of the one or more processors to perform operations that may include but are not limited to receiving a first signal emitted from one or more sources. A second signal may be received emitted from the one or more sources. A first confidence level that the wake-up-word is included in the first signal may be determined. A second confidence level that the wake-up-word is included in the second signal may be determined. It may be identified that the wake-up-word originated from a first source of the one or more sources based upon, at least in part, the first and second confidence levels. The first source may be enabled to participate in a dialogue phase.

One or more of the following example features may be included. At least a second source of the one or more sources may be excluded from participating in the dialogue phase. A wrapped Gaussian mixture model may be used, at least in part, to identify the one or more sources. A Bayes decision process may be used, at least in part, to identify the one or more sources. Movement of the first source may be tracked with at least one of one or more core localizers. The first signal and the second signal may be received at a microphone group. One or more angles at a given frequency expected to exhibit a maximum grating lobe may be determined based upon, at least in part, a latest model state. A beamformer may extract any source of the one or more sources except sources of the one or more sources deemed as interference.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

FIG. 4 is an example diagrammatic view of an example environment that may be used with a suppression process according to one or more example implementations of the disclosure.

Like reference symbols in the various drawings indicate like elements.

DETAILED DESCRIPTION

Figure 1:
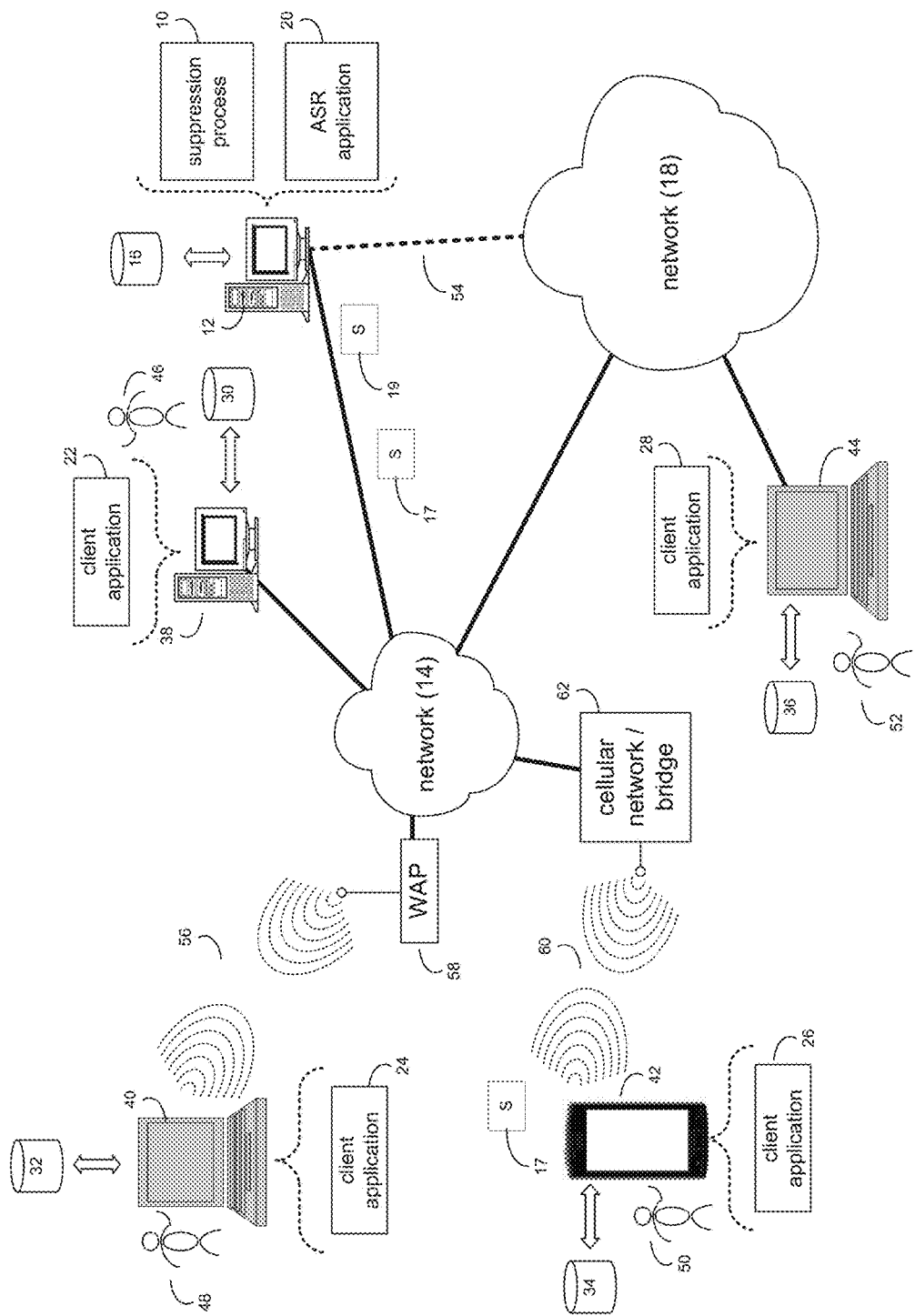
FIG. 1 is an example diagrammatic view of a suppression process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute emitted from the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown suppression process 10 that may reside on and may be executed by a computer (e.g., computer 12), which may be connected to a network (e.g., network 14) (e.g., the internet or a local area network). Examples of computer 12 (and/or one or more of the client electronic devices noted below and/or any suitable device that includes a microphone, speaker/loudspeaker, etc.) may include, but are not limited to, a storage system (e.g., a Network Attached Storage (NAS) system, a Storage Area Network (SAN)), a personal computer(s), a laptop computer(s), mobile computing device(s), a social network server, a text message server, a photo server, a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a suppression process, such as suppression process 10 of FIG. 1, may receive a first signal (e.g., signal 17) emitted from one or more sources. A second signal (e.g., signal 19) may be received emitted from the one or more sources. A first confidence level that the wake-up-word is included in the first signal may be determined. A second confidence level that the wake-up-word is included in the second signal may be determined. It may be identified that the wake-up-word originated from a first source of the one or more sources based upon, at least in part, the first and second confidence levels. The first source may be enabled to participate in a dialogue phase.

In some implementations, the instruction sets and subroutines of suppression process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility", as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, suppression process 10 may be a component of the data store, a stand-alone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute an automatic speech recognition (ASR) application (e.g., speech recognition application 20), examples of which may include, but are not limited to, e.g., an automatic speech recognition (ASR) application (e.g., modeling, etc.), a natural language understanding (NLU) application (e.g., machine learning, intent discovery, etc.), a text to speech (TTS) application (e.g., context awareness, learning, etc.), a speech signal enhancement (SSE) application (e.g., multi-zone processing/beamforming, noise suppression, etc.), a voice biometrics/wake-up-word processing application, a video conferencing application, a voice-over-IP application, a video-over-IP application, an Instant Messaging (IM)/ "chat" application, a short messaging service (SMS)/multimedia messaging service (MMS) application, or other application that allows for virtual meeting and/or remote collaboration and/or recognition/translation of spoken language into text and other types of computing devices that are controllable or otherwise operable based on natural language input received by computing devices. In some implementations, suppression process 10 and/or speech recognition application 20 may be accessed via one or more of client applications 22, 24, 26, 28. In some implementations, suppression process 10 may be a standalone application, or may be an applet/application/script/extension that may interact with and/or be executed within speech recognition application 20, a component of speech recognition application 20, and/or one or more of client applications 22, 24, 26, 28. In some implementations, speech recognition application 20 may be a standalone application, or may be an applet/application/script/extension that may interact with and/or be executed within suppression process 10, a component of suppression process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of suppression process 10 and/or speech recognition application 20. Examples of client applications 22, 24, 26, 28 may include, but are not limited to, e.g., an automatic speech recognition (ASR) application, a natural language understanding (NLU) application, a text to speech (TTS) application, a speech signal enhancement (SSE) application, a voice biometrics/wake-up-word processing application, a video conferencing application, a voice-over-IP application, a video-over-IP application, an Instant Messaging (IM)/"chat" application, a short messaging service (SMS)/multimedia messaging service (MMS) application, or other application that allows for virtual meeting and/or remote collaboration and/or recognition/ translation of spoken language into text and other types of computing devices that are controllable or otherwise operable based on natural language input received by computing devices, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a remote control, an audio system, a smart television, a media (e.g., video, photo, etc.) capturing device, a dedicated network device, or combination thereof. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of suppression process 10 (and vice versa). Accordingly, in some implementations, suppression process 10 may be a purely server-side application, a purely client-side application, or a hybrid server-side/client-side application that is cooperatively executed by one or more of client applications 22, 24, 26, 28 and/or suppression process 10.

In some implementations, one or more of client applications 22, 24, 26, 28 may be configured to effectuate some or all of the functionality of speech recognition application 20 (and vice versa). Accordingly, in some implementations, speech recognition application 20 may be a purely server-side application, a purely client-side application, or a hybrid server-side/client-side application that is cooperatively executed by one or more of client applications 22, 24, 26, 28 and/or speech recognition application 20. As one or more of client applications 22, 24, 26, 28, suppression process 10, and speech recognition application 20, taken singly or in any combination, may effectuate some or all of the same functionality, any description of effectuating such functionality via one or more of client applications 22, 24, 26, 28, suppression process 10, speech recognition application 20, or combination thereof, and any described interaction(s) between one or more of client applications 22, 24, 26, 28, suppression process 10, speech recognition application 20, or combination thereof to effectuate such functionality, should be taken as an example only and not to limit the scope of the disclosure.

In some implementations, one or more of users 46, 48, 50, 52 may access computer 12 and suppression process 10 (e.g., using one or more of client electronic devices 38, 40, 42, 44) directly through network 14 or through secondary network 18. Further, computer 12 may be connected to network 14 through secondary network 18, as illustrated with phantom link line 54. Suppression process 10 may include one or more user interfaces, such as browsers and textual or graphical user interfaces, through which users 46, 48, 50, 52 may access suppression process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
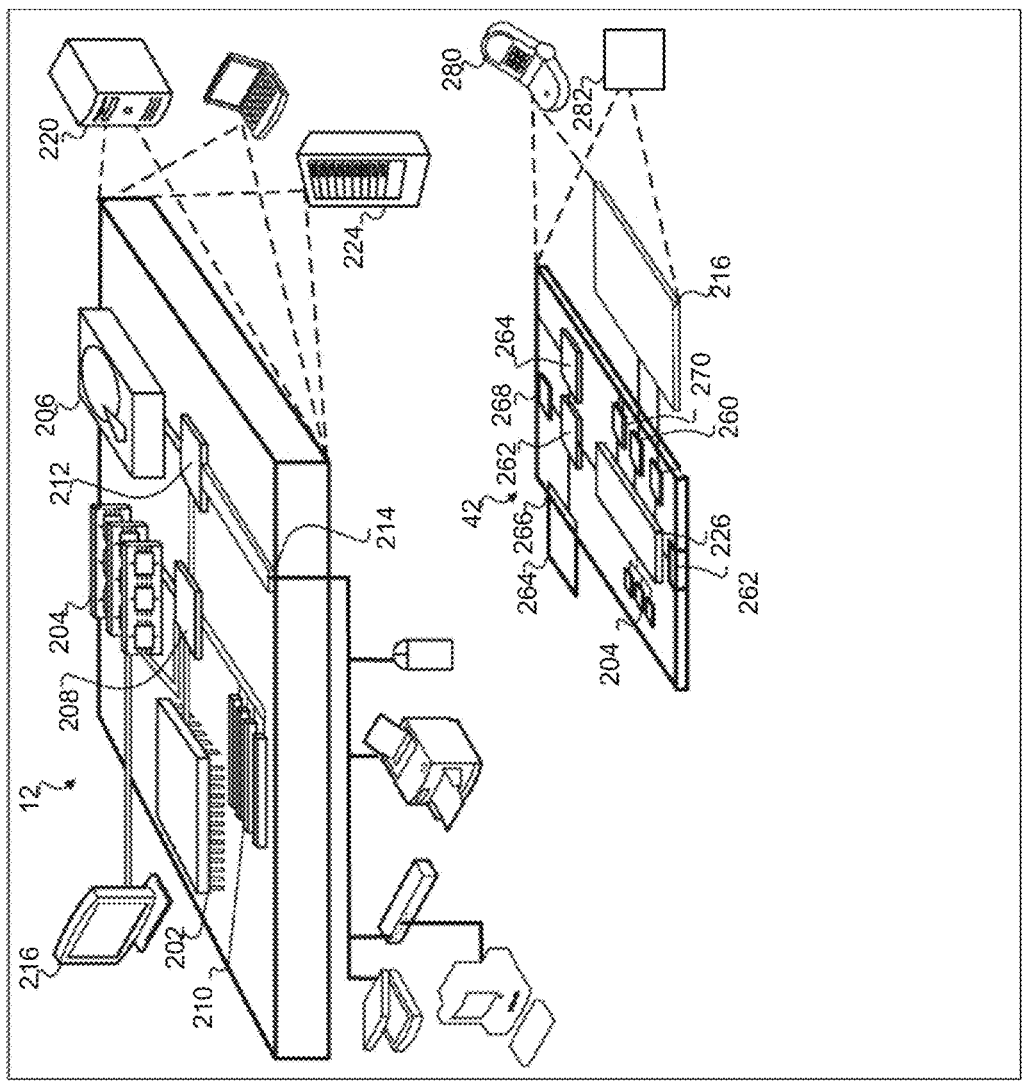
FIG. 2 is an example diagrammatic view of a computer and client electronic device of FIG. 1 according to one or more example implementations of the disclosure.

Referring also to the example implementation of FIG. 2, there is shown a diagrammatic view of computer 12 and client electronic device 42. While client electronic device 42 and computer 12 are shown in this figure, this is for example purposes only and is not intended to be a limitation of this disclosure, as other configurations are possible. Additionally, any computing device capable of executing, in whole or in part, suppression process 10 may be substituted for client electronic device 42 and computer 12 (in whole or in part) within FIG. 2, examples of which may include but are not limited to one or more of client electronic devices 38, 40, and 44. Client electronic device 42 and/or computer 12 may also include other devices, such as televisions with one or more processors embedded therein or attached thereto as well as any of the microphones, microphone arrays, and/or speakers described herein. The components shown here, their connections and relationships, and their functions, are meant to be examples only, and are not meant to limit implementations of the disclosure described.

In some implementations, computer 12 may include processor 202, memory 204, storage device 206, a high-speed interface 208 connecting to memory 204 and high-speed expansion ports 210, and low speed interface 212 connecting to low speed bus 214 and storage device 206. Each of the components 202, 204, 206, 208, 210, and 212, may be interconnected using various busses, and may be mounted on a common motherboard or in other manners as appropriate. The processor 202 can process instructions for execution within the computer 12, including instructions stored in the memory 204 or on the storage device 206 to display graphical information for a GUI on an external input/output device, such as display 216 coupled to high speed interface 208. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

Memory 204 may store information within the computer 12. In one implementation, memory 204 may be a volatile memory unit or units. In another implementation, memory 204 may be a non-volatile memory unit or units. The memory 204 may also be another form of computer-readable medium, such as a magnetic or optical disk.

Storage device 206 may be capable of providing mass storage for computer 12. In one implementation, the storage device 206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 204, the storage device 206, memory on processor 202, or a propagated signal.

High speed controller 208 may manage bandwidth-intensive operations for computer 12, while the low speed controller 212 may manage lower bandwidth-intensive operations. Such allocation of functions is exemplary only. In one implementation, the high-speed controller 208 may be coupled to memory 204, display 216 (e.g., through a graphics processor or accelerator), and to high-speed expansion ports 210, which may accept various expansion cards (not shown). In the implementation, low-speed controller 212 is coupled to storage device 206 and low-speed expansion port 214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Computer 12 may be implemented in a number of different forms, as shown in the figure. For example, computer 12 may be implemented as a standard server 220, or multiple times in a group of such servers. It may also be implemented as part of a rack server system 224. Alternatively, components from computer 12 may be combined with other components in a mobile device (not shown), such as client electronic device 42. Each of such devices may contain one or more of computer 12, client electronic device 42, and an entire system may be made up of multiple computing devices communicating with each other.

Client electronic device 42 may include processor 226, memory 204, an input/output device such as display 216, a communication interface 262, and a transceiver 264, among other components. Client electronic device 42 may also be provided with a storage device, such as a microdrive or other device, to provide additional storage. Each of the components 226, 204, 216, 262, and 264, may be interconnected using various buses, and several of the components may be mounted on a common motherboard or in other manners as appropriate.

Processor 226 may execute instructions within client electronic device 42, including instructions stored in the memory 204. The processor may be implemented as a chipset of chips that include separate and multiple analog and digital processors. The processor may provide, for example, for coordination of the other components of client electronic device 42, such as control of user interfaces, applications run by client electronic device 42, and wireless communication by client electronic device 42.

In some embodiments, processor 226 may communicate with a user through control interface 258 and display interface 260 coupled to a display 216. The display 216 may be, for example, a TFT LCD (Thin-Film-Transistor Liquid Crystal Display) or an OLED (Organic Light Emitting Diode) display, or other appropriate display technology. The display interface 260 may comprise appropriate circuitry for driving the display 216 to present graphical and other information to a user. The control interface 258 may receive commands from a user and convert them for submission to the processor 226. In addition, an external interface 262 may be provide in communication with processor 226, so as to enable near area communication of client electronic device 42 with other devices. External interface 262 may provide, for example, for wired communication in some implementations, or for wireless communication in other implementations, and multiple interfaces may also be used.

In some embodiments, memory 204 may store information within the Client electronic device 42. The memory 204 can be implemented as one or more of a computer-readable medium or media, a volatile memory unit or units, or a non-volatile memory unit or units. Expansion memory 264 may also be provided and connected to client electronic device 42 through expansion interface 266, which may include, for example, a SIMM (Single In Line Memory Module) card interface. Such expansion memory 264 may provide extra storage space for client electronic device 42, or may also store applications or other information for client electronic device 42. Specifically, expansion memory 264 may include instructions to carry out or supplement the processes described above, and may include secure information also. Thus, for example, expansion memory 264 may be provide as a security module for client electronic device 42, and may be programmed with instructions that permit secure use of client electronic device 42. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product may contain instructions that, when executed, perform one or more methods, such as those described above. The information carrier may be a computer- or machine-readable medium, such as the memory 204, expansion memory 264, memory on processor 226, or a propagated signal that may be received, for example, over transceiver 264 or external interface 262.

Client electronic device 42 may communicate wirelessly through communication interface 262, which may include digital signal processing circuitry where necessary. Communication interface 262 may provide for communications under various modes or protocols, such as GSM voice calls, SMS, EMS, or MMS speech recognition, CDMA, TDMA, PDC, WCDMA, CDMA2000, or GPRS, among others. Such communication may occur, for example, through radio-frequency transceiver 264. In addition, short-range communication may occur, such as using a Bluetooth, WiFi, or other such transceiver (not shown). In addition, GPS (Global Positioning System) receiver module 268 may provide additional navigation and location-related wireless data to client electronic device 42, which may be used as appropriate by applications running on client electronic device 42.

Client electronic device 42 may also communicate audibly using audio codec 270, which may receive spoken information from a user and convert it to usable digital information. Audio codec 270 may likewise generate audible sound for a user, such as through a speaker, e.g., in a handset of client electronic device 42. Such sound may include sound from voice telephone calls, may include recorded sound (e.g., voice messages, music files, etc.) and may also include sound generated by applications operating on client electronic device 42.

Client electronic device 42 may be implemented in a number of different forms, as shown in the figure. For example, it may be implemented as a cellular telephone 280. It may also be implemented as part of a smartphone 282, personal digital assistant, remote control, vehicular sound, navigation, or phone system, or other similar mobile device.

Generally, multisource classifiers (identifiers) may be used, e.g., for SSE purposes, to help determine which input sources should be used in ASR, and which should be excluded. For instance, the principle may be to have some core localizer that delivers the raw localization data (for instance "steered response power"). The raw data may then be classified into different classes corresponding to the sources. Existing methods for this may represent the raw input data in every frame (e.g., 10-20 ms) as a Gaussian Mixture model (GMM). This GMM may be initialized to have many classes (sources) and then the number of classes is shrunk iteratively. The commonly used algorithm for fitting a GMM is the "Expectation Maximization" algorithm (EM). Due to the shrinking, many iterative steps are generally required, which makes it computationally more demanding, and the fitting algorithm may restart in every frame. However, as will be discussed below, the present disclosure may instead be based on an adaptive GMM, e.g., meaning the source positions are typically only changed from frame to frame and may typically decide, e.g., once per frame, whether the incoming data may be explained by the sources already learned, or whether it belongs to a new source. If no new source is detected, a single EM-step may be carried out, compared to e.g., 50 steps in the known methods.

As will be discussed below, suppression process 10 may at least help, e.g., improve ASR technology, necessarily rooted in computer technology in order to overcome an example and non-limiting problem specifically arising in the realm of ASR systems to improve existing speech enhancement technological processes associated with, e.g., multi-source ASR environments.

Figure 3:
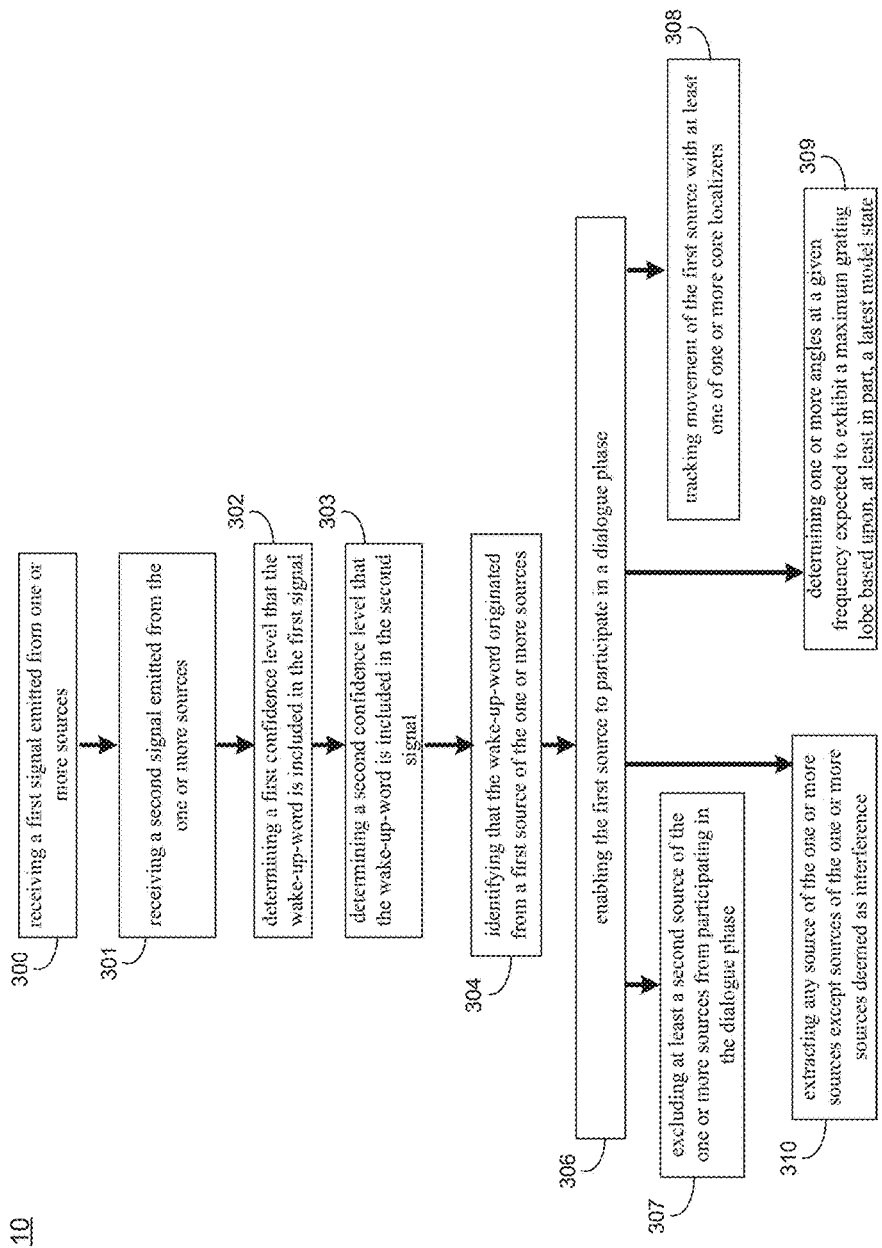
FIG. 3 is an example flowchart of a suppression process according to one or more example implementations of the disclosure.

The Suppression Process:

As discussed above and referring also at least to the example implementations of FIGS. 3-4, suppression process (SP) 10 may receive 300, by a computing device, a first signal emitted from one or more sources. SP 10 may receive 301 a second signal emitted from the one or more sources. SP 10 may determine 302 a first confidence level that the wake-up-word is included in the first signal. SP 10 may determine 303 a second confidence level that the wake-up-word is included in the second signal. SP 10 may identify 304 that the wake-up-word originated from a first source of the one or more sources based upon, at least in part, the first and second confidence levels. SP 10 may enable 306 the first source to participate in a dialogue phase.

In some implementations, and referring at least to the example implementation of FIG. 4, SP 10 may receive 300, by a computing device, a first signal (e.g., signal 17) emitted from one or more sources (e.g., audio/acoustic source, such as user 46), and SP 10 may receive 301 a second signal (e.g., signal 19) emitted from the one or more sources (e.g., audio/acoustic source, such as wireless TV speaker 402). It will be appreciated that the one or more sources associated with the first signal and the one or more sources associated with the second signal may be the same sources, different sources, or combinations thereof (e.g., first source+second source=first signal, or second source+third source=second signal, etc.) The sources may emit their respective signals that may be recorded by microphones. As will be discussed below, the microphone signals may be processed, for example, with acoustic sources being spatially localized and tracked, and with the respective output signals being generated such that the different sources are separated in the signals. On the one hand, the first signal may contain portions of another source (e.g., second, third, etc.). On the other hand, a first source may also be contained in the second signal. Thus, as will be discussed more below, if a wake-up-word is detected in either signal, SP 10 may have the goal to determine which source was actually responsible for the wake-up-word. In some implementations, SP 10 may focus on two (or more) selected sources to extract their respective received signals. For instance, as will be discussed below, each of the two respective output signals may be used for Wake-up-Word (WuW) spotting and the relative confidence of the two WuW recognizers may be determined 302/303 and used as prior knowledge to decide which of the two (or more) present sound sources cannot participate in a dialogue phase. As an example, SP 10 may be based on a multisource localization algorithm. This may provide information about the number of sources, their location, as well as activity information (e.g., a sound source may currently be silent or not). Based on this information, two beamformers may be controlled by SP 10 in the sense that their steering angle may be determined. During the WuW spotting phase, the beams may jump towards every sound source that is detected as a new source. Generally, the beam that is closest to that source may take it. This essentially makes SP 10 listen into all possible directions. However, SP 10 may also monitor whether a source is moving or not, and/or how active the source is. Once a source is found that has been active for some time (e.g., a threshold time of 1 second) and is additionally not moving, one beam may be set aside for that source, which may from then on continue to capture that source (i.e., a source of interest). The source may be, e.g., a TV (e.g., TV 400) or TV speaker (e.g., wireless TV speaker 402), but may also be a speaking person (e.g., user 46) that may possibly utter the WuW. In both cases, SP 10 may consider each source as a source of interest.

In some implementations, SP 10 may determine 302 a first confidence level that the wake-up-word is included in the first signal, may determine 303 a second confidence level that the wake-up-word is included in the second signal, and may compare the first confidence level with the second confidence level to determine the first confidence level is higher than the second confidence level and thus identify 304 that the wake-up-word originated from a first source of the one or more sources based upon, at least in part, the first and second confidence levels. That is, SP 10 may use the a priori information contained in the confidences to identify the WuW source that actually uttered the WuW. WuW detectors may be applied to the output signals. When the wake-up-word is detected, multiple information about the WuW may be exploited in order to identify the source that was most likely responsible for the wake-up-word. When this "source capturing" has become active, the second beam may jump on any new source that is detected (e.g., new sources are likely to be the WuW). In the example, the output signals of the two beams may then contain the non-moving (static) but active source (e.g., TV 400) and some other source that was active (e.g., user 46). These two signals may be presented to two separate WuW recognizers (via SP 10) that may deliver some confidence along with their detection result (e.g., a confidence level comparing the two confidence levels to determine whether the WuW originated from the first source (e.g., the one with the higher or threshold confidence level)). Assuming the beamformers have done a satisfactory job in separating the signals, the first WuW recognizer may have detected the WuW (with a higher confidence level), while the second WuW recognizer did not recognize it (with a lower confidence level) (or vice versa). In this example scenario, there would be very clear information about the location of the spoken WuW being available (because SSE concentrated on the right two sources and separated them well). After SP 10 completes the WuW recognition, SP 10 may then "know" from where the WuW was spoken (e.g., without having considered the pure localization information that may be available in SSE). Thus, SP 10 may perform WuW detection on each such resulting preprocessed output signal. The preprocessing described above provides a separation of the signals. This preprocessing may be beneficial at least because if there were no separation before sending the signals to the WuW recognizer, the concept of using the WuW confidences may not work. The difference in the WuW confidences may be generated by the separation. This way, the signal processing may provide a focus on two sources, while it may not be clear which of them would be the desired WuW source.

In some implementations, SP 10 may use the confidences associated with the WuW detections of each output channel as prior information to detect the WuW source (from the set of possible sources as found by the multisource localization). Due to the separation, there may be differences in the WuW confidences now. This may be beneficial, since until now, the confidence ratio has not been exploited, but this may be what carries the important information. SP 10 may now feed the relative confidence back to the SSE, which in turn also may have information about the source likelihoods and combine both information.

Thus, in some implementations, SP 10 may combine such prior information with the likelihood information available from the multisource localization. For example, the SSE may find that only a few sources are actually active. This may be a TV playing permanently during the WuW utterance, as well as a second source, namely the WuW source. However, the TV may be present all the time and may therefore be very dominant, while the WuW is possibly only present in very few frames. This means that the SSE may only figure out that there is one very dominant source. This source, however, actually may be the TV in this example, and there may not be a means for SSE to decide to pick the other source. The TV may appear as the most likely WuW source, which is wrong. Now, as SP 10 has provided two output signals in the two beams with sufficient source separation performance, the WuW recognizer (via SP 10) may tell which of those two sources has actually spoken the WuW, relying on the separation. Thus, now SP 10 may tell the SSE to focus on the source that is less dominant and to not pick the dominant source because the WuW recognizer has detected the WuW here with a higher confidence. As a result, the robustness with regard to directional interferers is increased, which is an example goal. Notably, SP 10's use of SSE on its own may determine how dominant any source was during a given time span (e.g., localization model may be buffered and a lookback may be performed). Using this known approach, the WuW may be detected in some time interval and SSE may be asked which angle is most likely responsible for uttering the WuW, and thus, the WuW may then be localized. The time interval when the wake-up-word was spoken may be aligned with the activity of the different sources. A source that was active during the interval may be responsible for the wake-up-word, however, it could also be an interference. However, using the "lookback" approach may have strong interferences during the lookback time window, which may falsely be detected as the WuW. However, using the present disclosure, SP 10 may now have additional information from the two WuW recognizers (i.e., it is now "known" which beam (and thereby identified which source) triggered the WuW recognizer). This may now be considered prior information regarding the decision "which source has spoken the WuW." As the likelihood information available SSE-internally may suffer from interferers (as explained above), SP 10 may use the prior information from the WuW, such that SP 10 may now exclude interferes, even if they are "active" during the WuW time window.

In some implementations, SP 10 may combine the likelihood and prior information in the above-noted lookback mechanism (e.g., storing localization data in buffers in order to focus on the time span when the WuW has been spoken). There may be different ways of implementing this. For instance, one approach may store the GMM weights and detect the source activity during the WuW timespan from this. Another example approach may be to store all the model parameters and to compute the likelihood for all the possible sources given the data in the lookback time-window. If prior information is available, this likelihood based decision may then be turned in to a Bayes decision, which may place a focus on the important source (according to the prior) and de-emphasize the other sources. Tracking the movement may fail in the example case that the speaker moves while being silent (e.g., short speech pause). When the speaker continues speaking, they may be recognized as a new (so far unknown) source at the new position. To overcome this example problem, not only the original WuW source may be taken into account for the dialogue phase, but also other sources may be used. To prevent accidentally jumping to sources known to be noise, these sources may be "forbidden" and are not used for the dialogue.

In some implementations, SP 10 may extract 310, by a beamformer, any source of the one or more sources except sources of the one or more sources deemed as interference. For instance, SP 10 may control a beamformer to extract the signal of the desired (WuW) source during the dialogue (e.g., after WuW has been recognized and source has been detected). However, practically, the problem may arise that moving speakers may suddenly appear as a "new" source at a different position. In reality, the person may have been simply quiet, moved and spoke another utterance from some different position. If it did actually stick to the source, SP 10 may then miss the second utterance.

To help address this issue, SP 10 may control the beamformer to extract any source except for those deemed interference If SP 10 only makes sure the beam does not jump to the noise source, the problem described above may not appear. Therefore, during the lookback, SP 10 may first figure out which source has uttered the WuW, and then look at the other sources (even those that were not active during the WuW utterance) and not allow the beam to pick them during the dialogue. The beam may then jump to any new source and pick up the voice of the person that has moved, but it may be ensured that the TV that has been playing all the time (but did not move and was therefore found to be an interesting source) is kept out of the dialogue.

A source that was covered by the output signal that mostly triggered the WuW detector may be a strong candidate for the desired speaker. Thereby, the degree of separation of the output signals may be taken into account. The degree of separation of sources in the output signals may be judged by the confidences of all wake-up-word detectors: when the WuW was detected in only one output, a strong separation may be assumed. On the other hand, when the WuW was detected by multiple detectors, the separation may be weak. In the latter case, SP 10 may not be able to trust the separation of the outputs signals and may have to rely on the time-interval for the identification of the wake-up-word source.

In some implementations, for example, the source that has been deemed a source of interest because it is not moving may now be excluded by SP 10, since its WuW ASR did not react at all. Thus, SP 10 may turn a maximum likelihood based decision into a Bayes decision (or other appropriate decision type) to identify the one or more sources by incorporating the prior information. While for simplicity reasons there is described an extreme case (e.g., only one WuW ASR fires) for simplicity, it will be appreciated that there may likely be two or more WuW ASRs of SP 10 that may identify the WuW, but with different confidences (e.g., depending on the signal separation performance of SP 10's SSE). Therefore, the Bayes decision process described above may be made soft by considering the ratio of WuW confidences. For instance, if both WuW ASRs are equally confident, a uniform distribution (over the spatial angle) may be used and SP 10 may fall back to the likelihood decision. However, if one WuW ASR is more confident than the other WuW ASR by comparison, SP 10 may put a focus on to the direction the beam was steered and it becomes possible to better detect a WuW even in the presence of interferences. Thus, SP 10 may exploit the relative WuW detection confidences to feed back the source separation gain offered by the beamformers during the WuW phase via the WuW recognizers to the signal extraction during the dialogue.

In some implementations, SP 10 may enable 306 the first source to participate in a dialogue phase, and SP 10 may exclude 307 at least the second source of the one or more sources from participating in the dialogue phase. For example, after identifying the source that was responsible for the WuW, this source may be tracked and its signal may be routed to one specific output. This output may then be used during the dialogue phase. As a non-limiting example of the above discussion, assume there is a voice controlled smart speaker in a living room with some (directional) noise in the background (e.g., such as a TV playing). In the example, SP 10 may be made aware of the TV source, separate it from other sources, and may attempt ASR on it in order to use the WuW detection information for the process of localizing the source of the WuW. Once the WuW has been localized in the noisy environment, SP 10 may exclude 307 the (now known) noise source(s) from the following dialogue phase when the WuW is detected. While SP 10 may only enable 306 use the "WuW source" during the dialogue phase, SP 10 may actually let the beam jump onto new sources, since a moving speaker may appear as a new source from the viewpoint of the source localization (e.g., short pause, then moving source, then say something again, such that the localizer may think it is a new source).

In some implementations, the first signal and the second signal may be received 300/301 at a circular microphone array. For example, regarding the localization portion of the disclosure, SP 10 may utilize a multisource localizer. Known multisource localizers cannot generally be operated with circular (microphone) arrays and must avoid frequencies corrupted by spatial aliasing (discussed further below). For example, with a circular array, the localization data is also circular: a source may move from 350° to 10° which is just a 20° step. Now assume that the observed raw data is spread around 0°/360° with a certain variance. Thus, to figure out the average position, known multisource localizers may the Gaussian Mixture model (GMM), but it may not represent the circular nature of the data. Therefore, the GMM cannot deal with this kind of data.

In some implementations, while SP 10 may still use a GMM, SP 10 may also use a so-called "wrapped Gaussian mixture" model (which is a circular extension of the known GMM) that may enable the usage of circular array geometries in a straight forward way to identify the one or more sources, while being more efficient. While a wrapped GMM is described, it will be appreciated that other probability density functions, such as a Laplacian Distribution to obtain a wrapped Laplacian mixture model, may also be used without departing from the scope of the disclosure. The efficiency may be increased, for example, because of a temporal adaptation rather than complete framewise re-estimation of the model. As such, SP 10 may use the wrapped GMM in a mixture model for multisource localization, which may enable the classification based multisource localization with a circular array. In some implementations, SP 10 may use the techniques above using multisource localization based on wrapped GMMs to enable multisource ASL with spherical or circular arrays. This may be a periodic extension of the standard Gaussian: another Gaussian to the left and one to the right, each moved by 360 degree. While this kind of probability density may be known, using this in a GMM based multisource classifier is unique. It may allow the usage of spherical or circular arrays. The problem with these arrays may be that the core localizers (e.g., such as Steered response power) may deliver data that may be spread around 0°/360° (circular). If a regular Gaussian is used in the GMM, the model may not realize that the data at 355° belongs to the data observed at 5°. It actually may appear as two different sources. Using a wrapped Gaussian may address this example problem, at least because the "main" Gaussian moves near to the 0°/360° point, covering that data at 355°, and the shifted part covers the data at 5°. In the EM algorithm, all these data points may then be attributed to the same class.

While a circular microphone array may be better than a linear microphone array (at least for the purposes of the present disclosure), it will be appreciated that a linear microphone array may still be used, but such an array may not be able to detect whether the source is coming from the front or back (i.e., 0°-180° angle). Wrapped Gaussian mixture model may not be needed for linear arrays (e.g., because they only may localize in one half plane)(0°-180°). Moreover, as another example, spherical microphone arrays may also be used. Thus, the microphone group (receiving the emitted signals from the one or more sources) may include such microphone types as, e.g., distributed microphones, linear microphone array(s), circular microphone array(s), spherical microphone array(s), 3-dimensional irregular array(s), etc., or combinations thereof. Moreover, in vehicles, there may be distributed microphones. The same or similar lookback mechanism exploiting relative WuW confidences may be applied to improve the WuW source detection, but there may be different localizer(s) (e.g., finding the microphone with the highest power). As such, the use of a circular microphone array (or any other type of microphone type) and in which environment the microphone is used should be taken as example only and not to otherwise limit the scope of the disclosure. Circular array geometries (like other shapes) may already exist, and they may be used for beamforming applications. While it may be beneficial to employ this array geometry for multi-source localization, this has not been possible without use of SP 10 in the present disclosure.

In some implementations, the temporal adaptive nature of SP 10 may give rise to an increased robustness with regard to spatial aliasing. Known classification based multisource localizers may simply exclude alias frequencies from the analysis because the aliasing terms appear as "ghost-sources." By contrast, SP 10 may use a temporal mixture model representing broadband information. Since the model used by SP 10 may be adaptive and may use a "bottom up" approach (discussed below), SP 10 may use the latest model state to determine 309 those angles at a given frequency that are expected to exhibit a maximum (grating lobes) as well (in addition to the main-lobe). Those angles may then be excluded from the detection of new sources, and in the EM, adaptation may be accounted to the actual source position. For a top down approach for the known multisource localization techniques, this is not generally possible, as such an approach may always start all over again just to find the number of classes in the present frame. Spatial aliasing may generally occur whenever the microphone spacing is greater than half the sound wavelength. Then, the observed relative delay between two microphone signals may no longer be mapped to one angle, but may have arisen from several angles. Several angles of sound incidence may then lead to the same observation and may not therefore be distinguished (i.e., a source location may not be known). The frequency and angle where those aliasing terms appear may depend on the microphone array geometry, as well as on the used core localizer. However, for a given array and localizer, SP 10 may determine it for the free sound field case (model). It may then be known for SP 10, that if there is a source at position A, then SP 10 must expect the localizer to also "see" a source at angle B at the respective frequency (i.e., the localizer may also have a power peak at the grating lobe (at angle B) and as consequence taking this angle as direction of arrival). Since SP 10 may use an adaptive model, SP 10 may have exactly this expectation from the current model, and thus SP 10 may be careful with respect to those angles (B) that SP 10 may know are probably aliasing terms caused by the source at A.

In some implementations, SP 10 may use external prior information (e.g., from a camera) to detect the WuW source. Even if there is only one beamformer, a camera may provide information about the location the desired WuW source (for instance because of face recognition). Thus, SP 10 may combine external information from the camera with the information available from the SSE.

As noted throughout, multisource localization using temporal adaptation of the GMM may be used to identify the WuW source. The temporal adaptation may be what enables a more efficient approach (with or without wrapped GMM). For instance, as opposed to known techniques, SP 10 may use an adaptation of the GMM over time. Usually in the EM algorithm, a maximum likelihood update of the parameters is done after the data points have been associated with the different classes. Known techniques may do this in every frame. After the EM algorithm is determined, known techniques propose to reduce the number of sources, both parts lead to many iterations in every frame (~50 or so). This method could be referred to as "Top down" since the number of sources is assumed large and is then reduced to the final value. By contrast, SP 10 may assume the number of sources is low (usually 0) and then detect whether a new source appeared as compared to what the model has learned so far. The first step consists therefore of this detection. Here, the incoming data is checked versus the current model (saying Source A is at angle 30°, source B is at angle 120°, etc.) if we find that the current model does not explain the new data, a new source may be created. Independent of this test, the statistics of the sources may be updated from frame to frame. To this end, SP 10 may use the principle of maximum a posteriori estimation, which assumes the current state of the model a prior information and updates its statistics (mean and variance) according to the new data, a mechanism that carries on the information learned. A maximum likelihood estimator would not necessarily do this and may only consider the new data. However, this adaptive "bottom up" scheme is much more efficient as only one EM step may be performed per frame (as opposed to, e.g., 50 with the known techniques).

Moreover, SP 10 may use the state of the adapted GMM to remove aliasing components from the raw localization data. For example, the idea is to use the temporal nature of the GMM in order to introduce robustness with regard to aliasing. For instance, the current state of the model may be used to compute those frequency-angle points where the respective source would produce aliasing. For example, it may be known in advance that if the array has 6 outer mics on a circle with radius 42 mm and one in the middle of the circle and a delay and sum beamformer is used for the steered response power method, there may be an expectation to have two maxima at 5000 Hz: one at the true angle of arrival (e.g., 30°) and another one at, say, 120°. Since this may be known in advance, SP 10 may compute it exactly using the free field sound propagation model (being considered in the interpretation of the observations). SP 10 may discard all those angle-frequency points if observed and may move those data back to the source where they actually stem from. In both cases, the detection of the new sources is no longer disturbed by the aliasing components The corrected data may now also drive the update of the source statistics (mean and variance).

In some implementations, movement of the first source may be tracked 308 with at least one of one or more core localizers (e.g., beamformers and a camera). For instance, while one or more implementations may use one or more beamformers (e.g., within wireless TV speaker 402) to track 308 movement of the first source (e.g., user 46), it will be appreciated that a camera (e.g., camera 404) may also be used by SP 10 to track 308 movement of one or more sources. For instance, core localizers of sources (via SP 10) may also not only use acoustic methods (like "steered response power," "generalized cross correlation" (GCC) or "multi-signal classification" (MUSIC)), but other methods like visual information gained via cameras may be exploited to localize sources (singly or in combination).

Thus, SP 10 may use multisource localization to control two or more beamformers in order to separate two or more sound sources (provided in two or more output signals), and may use multisource localization to detect active sources that do not move. This means that SP 10 may consider active sources that are not moving as a source of interest. SP 10 may also thus control at least one of the beamformers such as to capture this "active static" source, and control another beamformer to capture any other source. As a result, SP 10 may provide a multisource ASL based processing that provides a focus on one source deemed important (such as the TV) while any other possible source is captured by another beam. This leads to a spatially open behavior, where the second beam does not focus on the source captured by the first but may on anything else. Thus, in the example, controlling two beams such that one excludes signals captured by the other beam not only the steering angle may be controlled, but also the signal components that are minimized by the beamforming. This means optimizing the separation performance, e.g., the first beam lets source A pass without distortion and cancels source B, where the second beam does the exact opposite, e.g., lets source B pass without distortion but cancels source A, which may be achieved, for example, using the "Linearly Constrained Minimum Variance Design" for the beams.

While only two sources are described in the examples, it will be appreciated that more than two sources may also be used with the present disclosure. As such, the use of only two sources should be taken as example only and not to limit the scope of the disclosure.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
receiving, by a computing device, a first signal emitted from one or more sources;
receiving a second signal emitted from the one or more sources;
determining a first confidence level that a wake-up-word is included in the first signal;
determining a second confidence level that the wake-up-word is included in the second signal;
identifying that the wake-up-word originated from a first source of the one or more sources based upon, at least in part, the first and second confidence levels; and
enabling the first source to participate in a dialogue phase.

2. The computer-implemented method of claim 1 further comprising excluding at least a second source of the one or more sources from participating in the dialogue phase based upon, at least in part, historical information of the one or more sources.

3. The computer-implemented method of claim 1 wherein a Bayes decision process is used, at least in part, to identify the one or more sources.

4. The computer-implemented method of claim 1 wherein a wrapped Gaussian mixture model is used, at least in part, to identify the one or more sources.

5. The computer-implemented method of claim 1 further comprising tracking movement of the first source with at least one of one or more core localizers.

6. The computer-implemented method of claim 1 wherein the first signal and the second signal are received at a microphone group.

7. The computer-implemented method of claim 1 further comprising determining one or more angles at a given frequency expected to exhibit a maximum grating lobe based upon, at least in part, a latest model state.

8. The computer-implemented method of claim 1 further comprising extracting, by a beamformer, any source of the one or more sources except sources of the one or more sources deemed as interference.

9. A computer program product residing on a non-transitory computer readable storage medium having a plurality of instructions stored thereon which, when executed across one or more processors, causes at least a portion of the one or more processors to perform operations comprising: receiving a first signal emitted from one or more sources; receiving a second signal emitted from the one or more sources; determining a first confidence level that a wake-up-word is included in the first signal; determining a second confidence level that the wake-up-word is included in the second signal; identifying that the wake-up-word originated from a first source of the one or more sources based upon, at least in part, the first and second confidence levels; and enabling the first source to participate in a dialogue phase.

10. The computer program product of claim 9 further comprising excluding at least a second source of the one or more sources from participating in the dialogue phase based upon, at least in part, historical information of the one or more sources.

11. The computer program product of claim 9 wherein a Bayes decision process is used, at least in part, to identify the one or more sources.

12. The computer program product of claim 9 wherein a wrapped Gaussian mixture model is used, at least in part, to identify the one or more sources.

13. The computer program product of claim 9 wherein the operations further comprise tracking movement of the first source with at least one of one or more core localizers.

14. The computer program product of claim 9 wherein the operations further comprise extracting, by a beamformer, any source of the one or more sources except sources of the one or more sources deemed as interference.

15. The computer program product of claim 9 wherein the operations further comprise determining one or more angles at a given frequency expected to exhibit a maximum grating lobe based upon, at least in part, a latest model state.

16. A computing system including one or more processors and one or more computer readable media having a plurality of instructions stored thereon which, when executed across the one or more processors, causes at least a portion of the one or more processors to perform operations comprising:
receiving a first signal emitted from one or more sources;
receiving a second signal emitted from the one or more sources;
determining a first confidence level that a wake-up-word is included in the first signal;
determining a second confidence level that the wake-up-word is included in the second signal;
identifying that the wake-up-word originated from a first source of the one or more sources based upon, at least in part, the first and second confidence levels; and
enabling the first source to participate in a dialogue phase.

17. The computing system of claim 16 wherein the operations further comprise excluding at least a second source of the one or more sources from participating in the dialogue phase based upon, at least in part, historical information of the one or more sources.

18. The computing system of claim 16 wherein a Bayes decision process is used, at least in part, to identify the one or more sources.

19. The computing system of claim 16 wherein a wrapped Gaussian mixture model is used, at least in part, to identify the one or more sources.

20. The computing system of claim 16 wherein the operations further comprise at least one of extracting, by a beamformer, any source of the one or more sources except sources of the one or more sources deemed as interference and determining one or more angles at a given frequency expected to exhibit a maximum grating lobe based upon, at least in part, a latest model state.

* * * * *